(12) United States Patent
Malhan et al.

(10) Patent No.: US 9,746,388 B2
(45) Date of Patent: Aug. 29, 2017

(54) WIRELESS TELEMETRY USING VOLTAGE AND PULSE INTERVALS

(75) Inventors: Vishal Malhan, Bangalore (IN); Gautham Ramamurthy, Bangalore (IN); Vijay Tippanna Talikoti, Bangalore (IN); Latha John, Bangalore (IN); Deepa Menon, Malappuram (IN); Krishna R. Hegde, Bangalore (IN); Ramesh Venkanna, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 1705 days.

(21) Appl. No.: 13/272,939

(22) Filed: Oct. 13, 2011

(65) Prior Publication Data
US 2013/0003820 A1    Jan. 3, 2013

Related U.S. Application Data

(60) Provisional application No. 61/502,843, filed on Jun. 29, 2011.

(51) Int. Cl.
*G08C 17/00* (2006.01)
*G01L 3/10* (2006.01)

(52) U.S. Cl.
CPC .................................. *G01L 3/10* (2013.01)

(58) Field of Classification Search
CPC ........................................................ G01D 4/004
USPC ........ 340/870.28; 318/432, 493; 322/37, 59; 323/282; 361/160
See application file for complete search history.

(56) References Cited

U.S. PATENT DOCUMENTS

| | | | | |
|---|---|---|---|---|
| 4,223,267 A | * | 9/1980 | Sartorius | G01R 29/02 327/31 |
| 4,253,089 A | * | 2/1981 | Taniguti | G08C 17/02 340/870.19 |
| 4,627,296 A | * | 12/1986 | Morgan | G01L 3/101 73/1.11 |

(Continued)

FOREIGN PATENT DOCUMENTS

WO    2005068959 A2    7/2005

OTHER PUBLICATIONS

Product Brochure, "Multiplex Sensor Telemetry," 12 pages, downloadable from http://www.systemtech.se//fileadmin/resources/datasheets/manner/multiplex%20telemetry.pdf, downloaded on Oct. 13, 2011.

(Continued)

*Primary Examiner* — Amine Benlagsir
(74) *Attorney, Agent, or Firm* — Conley Rose, P.C.; Kristin Jordan Harkins (57) ABSTRACT

According to techniques of this disclosure in various examples, a wireless signaling system may include a stationary element such as a stator and a non-stationary element such as a rotor. The stationary element includes a stationary element controller. The stationary element is configured to transmit a wireless signal comprising a pair of pulses. The non-stationary element comprising a non-stationary element controller. The non-stationary element is configured to receive the wireless signal from the stationary element controller, measure a transition in voltage of each of the pulses and a time interval between the pulses, and interpret a signal based on the transition in voltage of each of the pulses and the time interval between the pulses.

20 Claims, 8 Drawing Sheets

(56) References Cited

U.S. PATENT DOCUMENTS

| | | | | |
|---|---|---|---|---|
| 5,055,775 | A * | 10/1991 | Scherz | G08C 17/04 |
| | | | | 310/268 |
| 5,457,450 | A * | 10/1995 | Deese et al. | 340/912 |
| 6,084,368 | A * | 7/2000 | Doemens et al. | 318/493 |
| 6,582,365 | B1 * | 6/2003 | Hines et al. | 600/300 |
| 6,584,419 | B1 * | 6/2003 | Alexander | G01R 29/027 |
| | | | | 702/117 |
| 7,131,333 | B2 | 11/2006 | Busch | |
| 7,656,135 | B2 * | 2/2010 | Schram et al. | 322/59 |
| 7,786,867 | B2 | 8/2010 | Hamel et al. | |
| 8,248,039 | B2 * | 8/2012 | Cao et al. | 322/37 |
| 2006/0171091 | A1 * | 8/2006 | Seale et al. | 361/160 |
| 2007/0258535 | A1 * | 11/2007 | Sammel | G06K 7/0008 |
| | | | | 375/262 |
| 2008/0037690 | A1 * | 2/2008 | Mason et al. | 375/345 |
| 2008/0160937 | A1 | 7/2008 | Baker et al. | |
| 2008/0169777 | A1 * | 7/2008 | Raja et al. | 318/432 |
| 2011/0006744 | A1 * | 1/2011 | Dearborn | 323/282 |
| 2011/0133950 | A1 * | 6/2011 | Subramanian et al. | 340/870.28 |

OTHER PUBLICATIONS

TF Data Sheet, "TF Series Torque Flange Sensor," 7 pages, retrievable from www.magtrol.com, dated Jul. 2005.
Product Brochure, "900 MHz Digital Intermediate Range System," ATi2000 Series Radio Telemetry System, 1 page, downloadable from http://www.a-tech.ca/doc_series/2050_RadioTelemetry_ATI.pdf, downloaded on Oct. 13, 2011.

* cited by examiner

WIRELESS TELEMETRY USING VOLTAGE AND PULSE INTERVALS

This application claims the benefit of U.S. Provisional Application No. 61/502,843, entitled, "TORQUE MEASUREMENT SYSTEM WIRELESS TELEMETRY USING VOLTAGE AND PULSE INTERVALS," and filed on Jun. 29, 2011, the entire content of which is incorporated herein by reference.

TECHNICAL FIELD

This disclosure relates generally to wireless telemetry and, more specifically, to techniques for transmitting commands and data in a wireless telemetry system between a stationary element and a non-stationary element.

BACKGROUND

A wireless telemetry system typically includes a stationary element and a non-stationary element in wireless communication, to communicate data and/or commands. For example, the wireless telemetry system for a torque measurement system typically includes a rotor and a stator. The rotor is generally configured to attach to a rotating system such as an engine turbine, gearbox, transmission, or other piece of rotating equipment. The rotor includes strain gauges for sensing torque, rotor electronics (RTE) for performing signal processing operations, and an antenna for inductively receiving power from the stator and for communicating with the stator. The stator is typically stationary and external to the rotating system and includes a coupling module (CM) in close proximity to the antenna of the rotor for receiving a signal from the RTE. The CM transfers the signal received from the rotor to stator electronics (STE) that perform signal processing to extract the torque measurements in the signal. The stator may, for example, work in conjunction with a personal computer to process and present the data collected by the RTE. The stator can also transmit instructions to the RTE, provide power to the RTE through inductive coupling, and receive status information transmitted by the RTE. The rotor and stator each include an inductive antenna for bi-directional communication.

SUMMARY

This disclosure generally describes a wireless telemetry system that includes a stationary element and a non-stationary element. The non-stationary element may be a rotor that is generally configured to attach to a rotating system such as an engine turbine, gearbox, transmission, or other piece of rotating equipment. The stationary element may be a stator that is typically stationary and external to the rotating system and includes a coupling module in close proximity to an antenna of the rotor. The rotor and stator each include an inductive antenna for bi-directional communication.

According to techniques of this disclosure in various examples, a wireless signaling system may include a stationary element such as a stator and a non-stationary element such as a rotor. The stationary element includes a stationary element controller, configured to transmit a wireless signal comprising a pair of pulses. The non-stationary element comprises a non-stationary element controller, configured to receive the wireless signal from the stationary element controller, measure a transition in voltage of each of the pulses and a time interval between the pulses, and interpret a signal based on the transition in voltage of each of the pulses and the time interval between the pulses.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

This disclosure describes a wireless telemetry system for a torque measurement system according to an illustrative example, and further details of a wireless telemetry system using voltage and pulse intervals to transmit commands and data.

In one example, this disclosure describes a wireless telemetry system for a torque measurement system that includes a rotor and a stator. The rotor is generally configured to attach to a rotating system such as an engine turbine, gearbox, transmission, or other piece of rotating equipment. The stator is typically stationary and external to the rotating system and includes a coupling module in close proximity to an antenna of the rotor. The rotor and stator each include an inductive antenna for bi-directional communication. The described torque measurement system, which includes the rotor and the stator, may be incorporated in a testing unit for testing cars and other motor vehicles, for example. The rotor is illustrative of non-stationary elements in general, and the stator is illustrative of stationary elements in general.

According to techniques of this disclosure in various examples, a torque measurement system may include a stator and a rotor, wherein the stator is configured to receive a wireless signal generated by a voltage signal from a rotor, wherein the stator is configured to transmit a series of pairs of voltage pulses, wherein each of the spikes has a pulse width, and wherein the pulses are separated in time by a pulse interval. The rotor may be configured to receive the wireless signal from the stator, to measure transitions in voltage over time in a voltage response corresponding to the voltage signal by which the wireless signal is generated, to reconstruct the pulse width of each of the spikes and the pulse interval of the pulses from the transitions in voltage over time, and to interpret commands or data from the pairs of voltage pulses.

Figure 1:
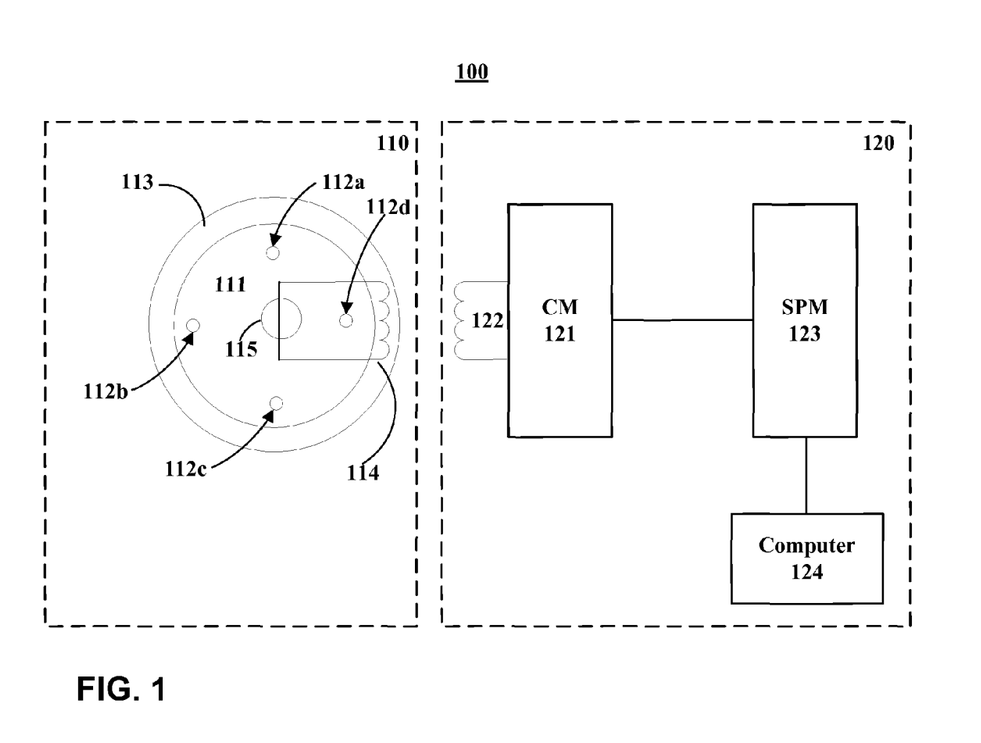
FIG. 1 is a simplified block diagram that illustrates one example of a torque measurement system configured to implement aspects of this disclosure.

FIG. 1 is a block diagram that illustrates one example of a torque measurement system 100 configured to implement aspects of this disclosure. Torque measurement system 100 includes rotor 110 and stator 120. Rotor 110 includes flange 111, holes 112a-112d, ring 113, antenna 114, and circuitry 115. Antenna 114 and circuitry 115 may collectively be referred to as the rotor electronics (RTE). Stator 120 includes coupling module (CM) 121, antenna 122, signal processing module (SPM) 123, and computer 124. Rotor 110 connects to a rotating mechanism such as a turbine of an engine through holes 112a-112d in flange 111. Flange 111 contains a series of strain gauges (not shown) for making torque measurements as rotor 110 rotates. The output of the strain gauges, also referred to as torque measurement signals, is transmitted from the strain gauges on flange 111 to circuitry 115. Circuitry 115 may be embedded on a printed circuit board and configured to perform a series of signal processing operations, such as amplification, digitization, and/or amplitude modulation, on the strain gauge output prior to transmitting the torque measurement signals to stator 120 via antenna 114, which may be embedded in ring 113.

Antenna 114 may be configured to both transmit and receive a radio frequency (RF) signal to and from antenna 122 of stator 120. The RF signal can be amplitude modulated to include digital data for purposes of communication. In addition to digital communication data, stator 120 also wirelessly supplies power to rotor 110 via electromagnetic induction from antenna 122 to antenna 114. When supplying power but not transmitting data, the RF signal transmitted from stator 120 to rotor 110 may not be amplitude modulated. The transmissions between antenna 114 and antenna 122 occur at a selected carrier frequency, which may illustratively be either approximately 6.78 MHz or 13.56 MHz, for example, but may also be at other frequencies. The carrier frequency is also sometimes referred to as the telemetry frequency. When torque measurement system 100 is in operation, ring 113 may be placed less than a few centimeters away from CM 121 and antenna 122 in one example. In some implementations CM 121 can be a caliper coupling module (CCM) in the shape of a caliper that partially surrounds ring 113.

Stator 120 receives the signal with the torque measurement data via antenna 122 from antenna 114 through inductive communication. Antenna 122 and antenna 114 can be inductively coupled coils, hoop antennas, or other appropriately suited types of antennas. Antenna 122 may be included in CM 121 which is located in close proximity to antenna 114 of rotor 110. CM 121 and SPM 123 perform various signal processing operations, such as demodulation and amplification, on the received signal to extract the torque measurement data obtained by rotor 110. CM 121, antenna 122, and SPM 123 may collectively be referred to in this disclosure as stator electronics (STE). Computer 124 can present the torque measurement data to a user of the system of FIG. 1.

The system of FIG. 1 is intended to illustrate the functionality of rotor 110 and stator 120 by showing one example configuration. The various functional units described for FIG. 1, however, may be implemented in numerous other configurations. For example, in some implementations the functionality of SPM 123 and computer 124 may be combined into a common device or unit. As another example, in some implementations antenna 122, CM 121, and SPM 123 may be included in a common device or unit, but in other examples, CM 121 and SPM 123 may be separate devices or units communicatively coupled through a wired or wireless channel.

In one example, the STE may include a series LC tuned circuit that includes a capacitor (C) in series with an inductor (L). The current in antenna 122 may be at a maximum value or close to a maximum value when the resonant frequency of the series LC circuit is approximately equal to the telemetry frequency, i.e. the carrier frequency. Additionally, the RTE includes a parallel LC tuned circuit, which includes a capacitor (C) in parallel with an inductor (L). The current in antenna 114 may be at a maximum value or close to maximum value when the resonant frequency of the parallel LC circuit of the RTE is approximately equal to the telemetry frequency.

SPM shown in FIG. 1 contains electronics which may interface the system to a computer through an interface such as RS232, RS485, CAN, USB or the like. The SPM may be powered by a switch mode power supply. The SPM may include an RF board which generates RF signals used for the wireless power transfer and data communications. The frequency of RF may be referred to as carrier frequency or telemetry frequency. This may be 6.78 MHz or 13.56 MHz as illustrative examples. In some torque measurement systems the stator module, (as inductively coupled with rotor module) contains the RF board. Whereas, in other torque measurement systems SPM may be included with the stator module, and inductively coupled with the rotor module. In the system shown above SPM and stator module are not integrated. The SPM and the stator module may be connected by an RF cable.

In an illustrative example, the CCM may be a tuned antenna connected to the SPM RF board through an RF coaxial cable. This may be a stationary antenna that communicates between the rotor electronics (RTE) antenna ring. This may be used to transfer power wirelessly to the rotor antenna and wirelessly connect to the rotor electronics to collect data.

Figure 5:
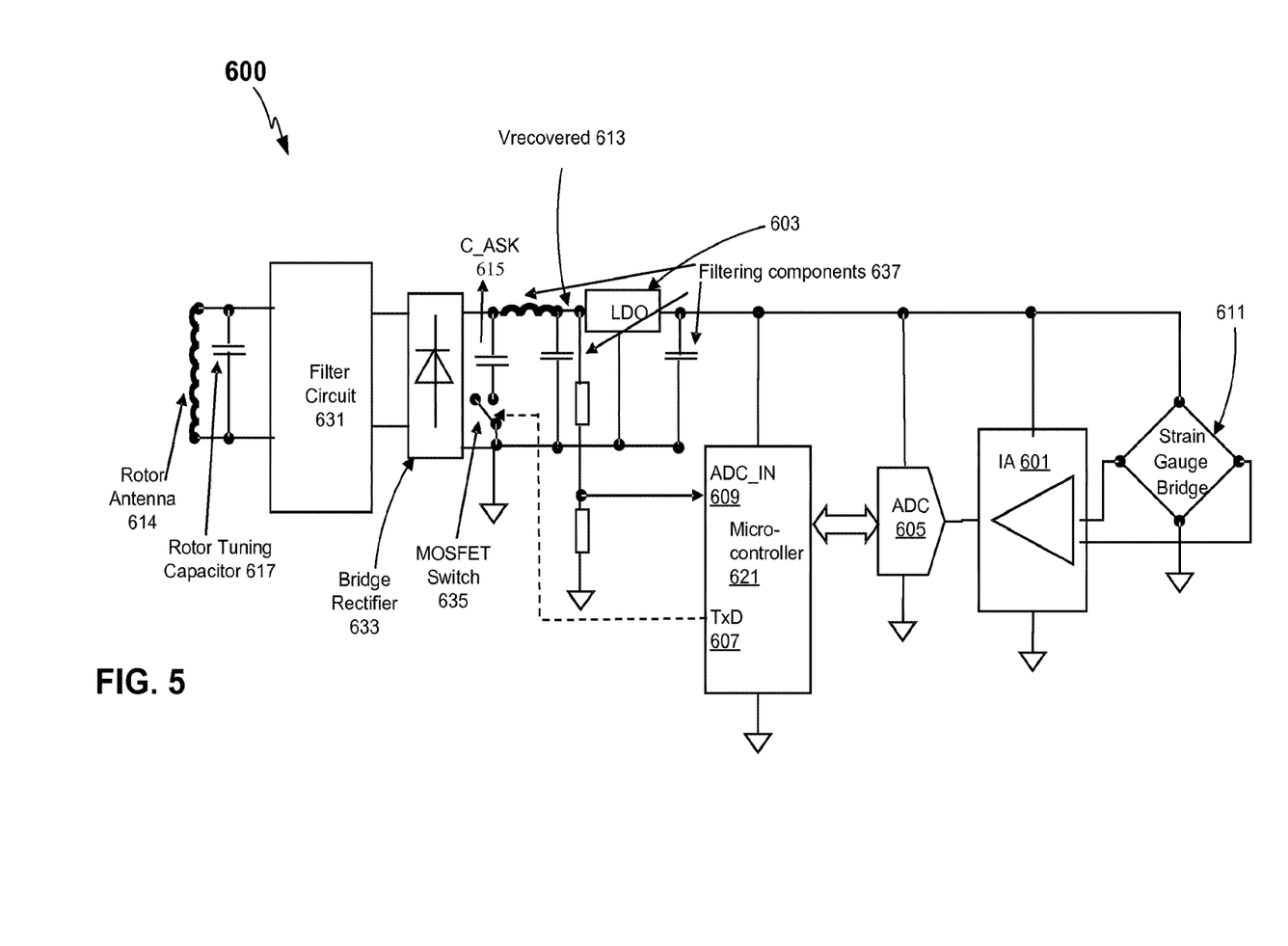
FIG. 5 is a circuit diagram showing components of rotor electronics implementing aspects of the present disclosure.

The rotor electronics unit may comprise a rotating part that contains a rotor antenna ring, rotor electronics printed circuit board (PCB), and a metallic flange embedded with strain gauges and interconnecting wires. The rotor ring antenna includes a coil and capacitors for tuning. The rotor ring electronics PCB 600 may take a form as shown in FIG. 5, for example. The rotor ring electronics PCB may be powered by energy harvesting through a bridge network to obtain DC voltage from the stator. The tuned circuit may provide a DC voltage of around 7.0 volts to the low dropout regulator (LDO), for example, though the voltage may be anywhere from about 5 to 10 volts, or other voltage levels outside this range in other examples. The proper functioning of the system may require a minimum voltage such as 5.2 volts for example. The strain gauge data may be digitized and modulated to the RF carrier, such as by the amplitude shift keying (ASK) technique or other techniques, for the data to be transferred to the stator.

Strain gauges on the rotor flange may sense torque. The strain gauge output may be amplified, digitized and serially transmitted to the stator by amplitude shift keying (ASK) on the carrier. This modulated carrier is demodulated in the stator, amplified, and sent serially to the stator microcontroller. The stator microcontroller deciphers the serial data, filters it, and outputs it to an end user device such as a computer in any of various forms, such as voltage, frequency, CAN, USB, RS232, RS485, Ethernet, etc. The stator can also send commands to the rotor to perform specific actions such as perform shunt cal (i.e. shunt calibration), adjust data rate, adjust number of data bits, etc. The type of command from stator to rotor is done by controlling the RF power in a series of pulses defining a control command from the stator to the rotor. If the transition in voltage of each of the pulses is measured to be greater than a transition threshold and the time interval between the pulses matches a first reference interval, then the control command is interpreted to indicate a calibration mode, and if the transition in voltage of each of the pulses is measured to be greater than a transition threshold and the time interval between the pulses matches a first reference interval, then the control command is interpreted to indicate a data collecting mode. In the calibration mode, the rotor controller performs at least one of a shunt calibration, adjusting a data rate, or adjusting a number of data bits, while in the data collecting mode, the rotor controller measures a torque and transmits data about the torque to the stator controller.

Figure 3:
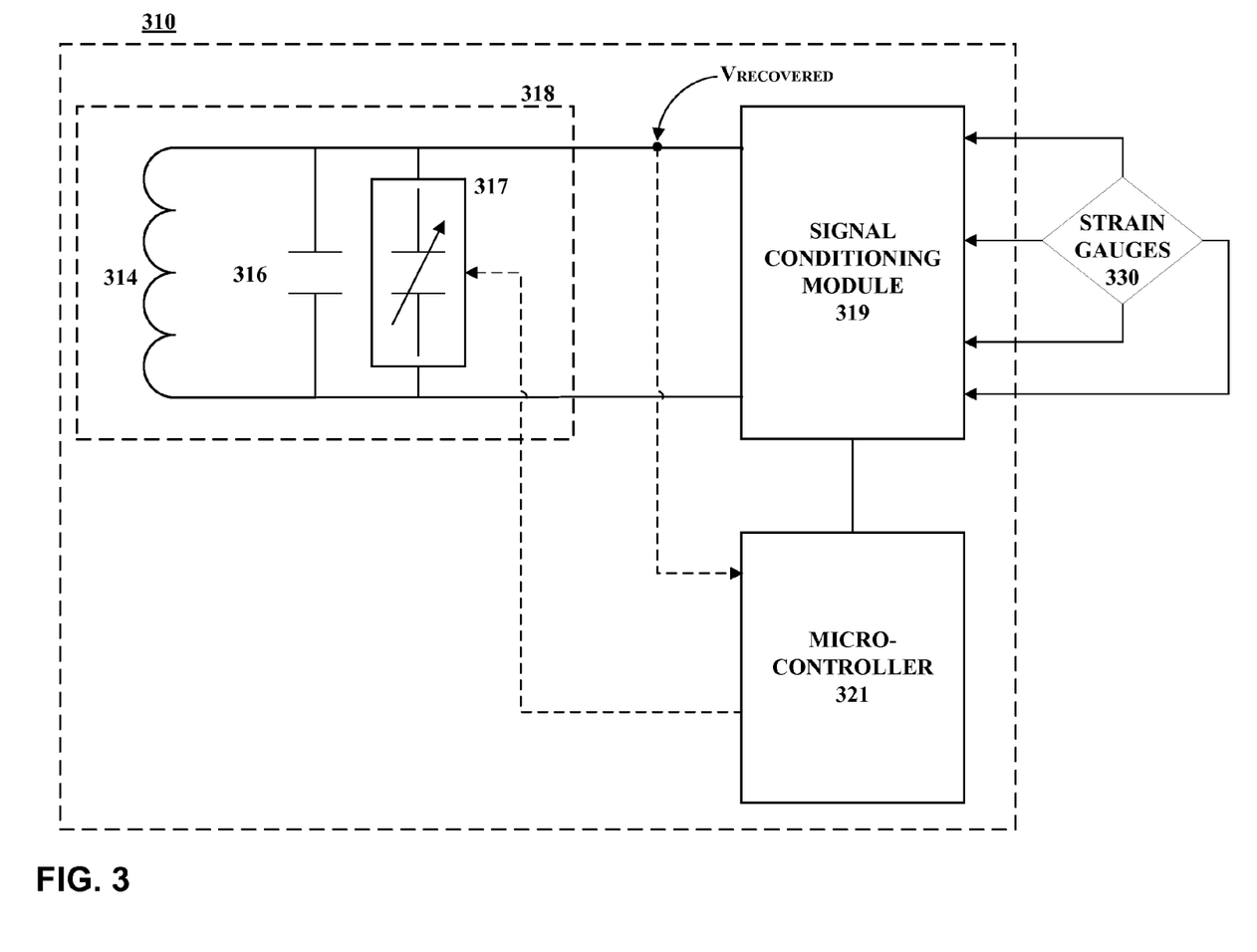
FIG. 3 is a circuit diagram showing components of rotor electronics implementing aspects of the present disclosure.

FIG. 3 is a circuit diagram showing components of rotor electronics (RTE) 310 of a rotor, such as rotor 110 of FIG. 1, that are configured to receive torque measurements signals from strain gauges 330. RTE 310 includes antenna 314, fixed capacitor 316, variable capacitive element 317, signal conditioning module (SCM) 319, and microcontroller 321. RTE 310 can both transmit a signal to a stator and receive a signal from a stator. When receiving a transmission, RTE 310 receives an RF signal from a stator at antenna 314. The components shown in box 318 may comprise a parallel LC circuit. The rotor microcontroller 321 is illustrative of non-stationary element controllers in general.

In implementation, the functionality of signal conditioning module (SCM 319) may perform amplification, filtering, signal rectification, analog-to-digital conversion, low dropout regulation, amplitude shift keying, and numerous other signal processing operations necessary or desirable for purposes of measuring torque values and communicating with a stator. In some implementations, these various functions may be performed by a plurality of units at various locations throughout RTE 310. The location of variable capacitive element 317 shown in FIG. 3 is merely one example configuration. In some configurations, for example, circuitry corresponding to the various functionalities of SCM 319, such as signal rectification, may occur between fixed capacitor 316 and variable capacitive element 317. The circuit diagram of FIG. 3 is merely intended to be one non-limiting example of the electronics that might be found in a rotor.

Figure 4:
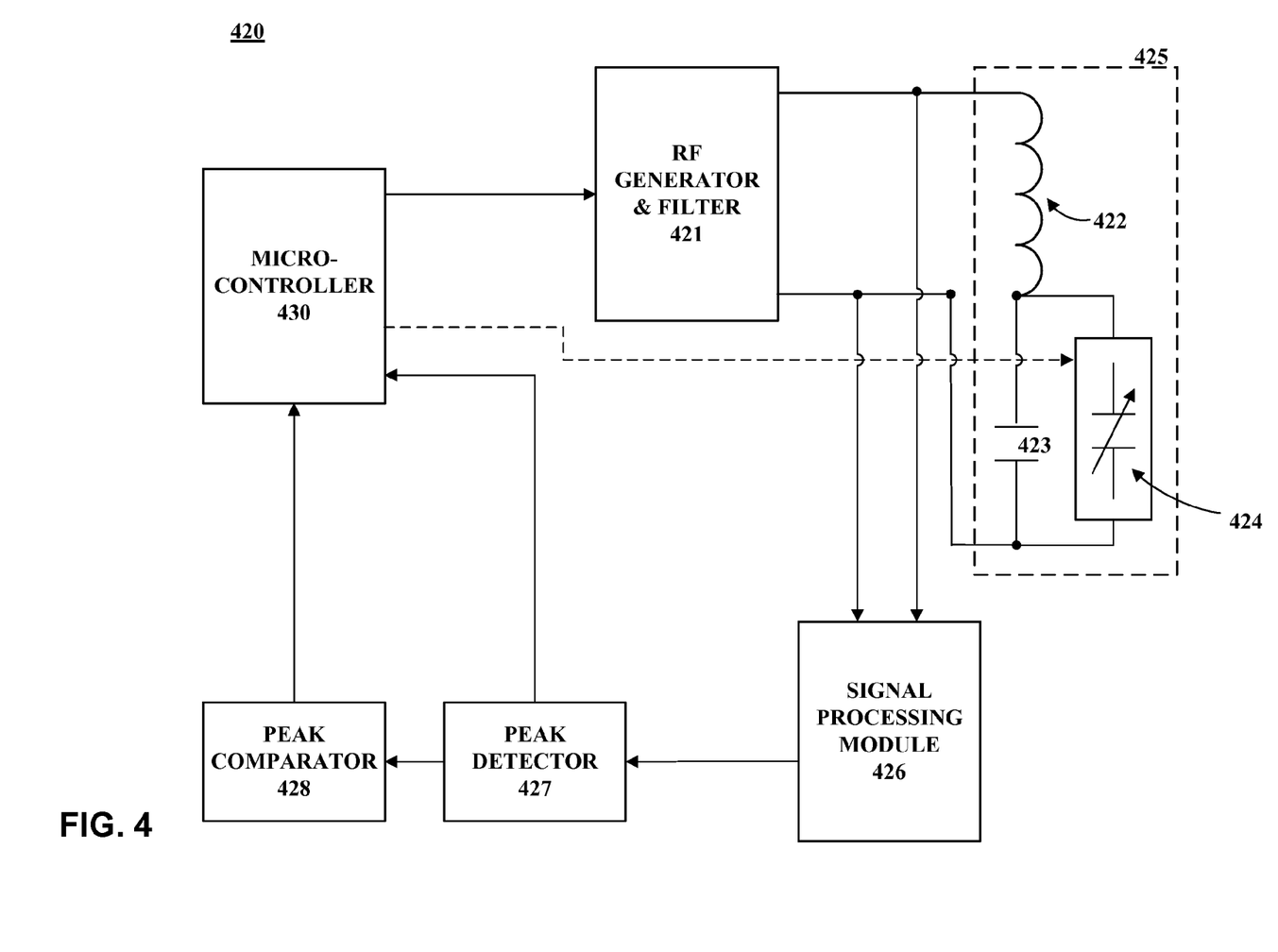
FIG. 4 is a circuit diagram showing components of stator electronics implementing aspects of the present disclosure.

FIG. 4 is a circuit diagram showing components of stator electronics (STE) 420 of a stator, such as stator 120 of FIG. 1. STE 420 includes an RF generator and filter 421, stator antenna 422, fixed capacitor 423, and variable capacitive element 424. The components shown in box 425 may collectively form a series LC circuit. In the example of FIG. 4, STE 420 further includes signal processing module (SPM) 426, peak detector 427, peak comparator 428, data inversion detection module, and microcontroller 430. Although not shown in FIG. 4, STE 420 may also include circuitry for detecting data inversion and may include amplitude modulation circuitry for modulating a signal with data for purposes of communicating with a rotor. STE 420 is configured to both transmit and receive a signal via stator antenna 422.

To transmit a signal, microcontroller 430 may cause RF generator and filter 421 to generate an amplitude modulated signal for transmission to a rotor. When receiving a signal SPM 426 can demodulate, filter, differentiate, and amplify the received signal. STE 420 may perform a wide array of signal processing functions on both transmitted and received signals. For ease of explanation, this disclosure generally attributes various functions to SPM 426, but in some implementations, one or more of the functions attributed to SPM 426 may be performed by a plurality of units at various locations throughout STE 420. The circuit diagram of FIG. 4 is merely intended to be one non-limiting example of the electronics that may be found in a stator. In some implementations, microcontroller 430 may receive, from a rotor, data identifying a recovered voltage $V_{RECOVERED}$ at the rotor. The stator microcontroller 430 is illustrative of stationary element controllers in general.

FIG. 5 shows a more detailed circuit diagram for a rotor electronics block (RTE) 600 of an illustrative example of a rotor. In FIG. 5, IA 601 represents an instrumentation amplifier, LDO 603 represents a low dropout regulator, ADC 605 represents an analog to digital converter, TxD 607 represents a transmit data pin of the microcontroller 621, and ADC_IN 609 represents internal ADC input pin for microcontroller 621. The instrumentation amplifier (IA) 601 amplifies the millivolt strain gauge signals from strain gauge bridge 611. The output of the IA 601 is fed to the ADC 605. The recovered voltage $V_{RECOVERED}$ 613 in the rotor is fed to the microcontroller 621 through a resistor voltage divider circuit. The low dropout regulator 603 may control the rotor electronics block's response to an intermediate voltage mode or a degraded voltage mode, as described below. Additional elements are depicted such as rotor antenna 614, rotor tuning capacitor 617, filter circuit 631, bridge rectifier 633, MOSFET switch 635, filtering components 637, and C_ASK 615.

Figure 6:
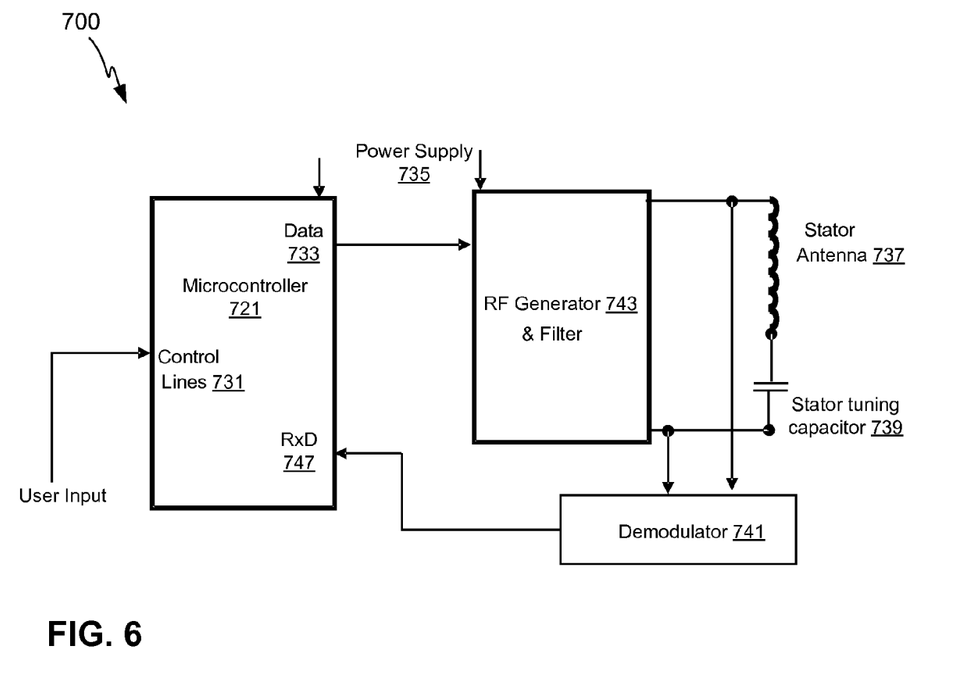
FIG. 6 is a circuit diagram showing components of stator electronics implementing aspects of the present disclosure.

FIG. 6 is a circuit diagram for a stator electronics block (STE) 700 of an illustrative example of a stator. In FIG. 6, the stator circuit includes a microcontroller 721, a demodulator 741, and an RF generator 743 (with filter). The RF generator 743 provides sufficient RF power to the rotor circuit, that is inductively coupled to the stator. The data received from the rotor is demodulated using the demodulator 741, and the serial data is fed to the RxD pin 747 of the microcontroller 721. Based on the user input, the microcontroller 721 suitably modulates the RF power to the rotor to communicate the user commands to the rotor microcontroller. Also depicted are control lines 731, data 733, power supply 735, stator antenna 737, and stator tuning capacitor 739.

In wireless telemetry based systems like torque measurement systems, temperature measurement systems and RFIDs, power is transferred from a stationary control unit to a moving part like RFID transmitter or rotating torque sensor. In return, the moving part transmits data relating to the device like measured torque or temperature back to the stationary control unit. Some systems use amplitude shift keying (ASK) as the method of data modulation at the moving part. Further, in some systems there is also need to send data or commands from the stationary control unit to the moving electronics. In case of torque sensors these commands may be used to query specific information about the moving part such as the serial number or batch number. In other examples the commands may be used to perform shunt calibrations, change mode of operation based on specific situation requirement, or perform other functions. These functions may be performed while maintaining the inductive power transfer from the stationary element controller to the non-stationary element controller.

In an illustrative example, one solution involves the following steps. As one aspect of an example solution, the stationary element controller may send relatively long pulses, such as greater than 20 microseconds, such as 3 milliseconds in an illustrative example. This relatively large pulse duration helps ensure that DC voltage recovered from RF received by the moving part, i.e. the rotor or other non-stationary element, drops to a particular transition threshold value, relative to the initial value. These pulses are therefore relatively long in the sense that they provide a meaningful signal margin and are resistant to noise. They can be used to define transition thresholds that are resistant to external noise coupling, and that don't require pulses to be detected in the non-stationary element at a point where the RF is not yet filtered to generate the DC power using a significant number of components in conjunction with a comparator.

As another aspect of an example solution, the stationary element controller may define a relatively long time interval between pulses, such as greater than 200 microseconds, e.g. in the range of three to nineteen milliseconds in one example, to help ensure that the time interval between pulses can be accurately and repeatably measured by the electronics in the non-stationary element. The aspects of the example solution as described herein also help prevent false triggers due to ASK data flow from the non-stationary element to the stationary element controller. As another aspect of an example solution, the stationary element controller may transmit pairs of pulses with different values of the time interval between the pulses for sending different commands, with each pulse interval in a pair of pulses mapped to a specific command, and a significant margin between different pulse intervals to help prevent errors in transmitting or reading the pulse intervals from being interpreted as erroneous commands. As yet another aspect of an example solution, the non-stationary element controller may measure the time interval between pulses transmitted by the stationary element controller to decode and interpret a command corresponding to the pulse interval, by measuring the recovered DC voltage using means such as an analog to digital converter.

The techniques outlined above may result in the following illustrative advantages. For one example, the techniques outlined above may provide more resistance to false triggers due to ASK data flow from the non-stationary element to the stationary element controller because the noise caused by ASK data flow does not significantly interfere with the recovered voltage. As another example, the techniques outlined above may be resistant to false triggers due to external noise coupling because the external noise does not significantly impact the recovered voltage. As another example, the techniques outlined above may enable the non-stationary element controller to use a relatively reduced number of components for detecting and interpreting a pulse interval for a command, leading to saving of real estate and reduction in cost relative to previously known techniques.

One illustrative example technique of this disclosure for communication between a stator and a rotor may be characterized as follows. Each command may include two pulses of the same width. The pulse interval, i.e. the time gap between the two pulses, may be different for different commands. The pulse train may be generated at stationary control unit and the RF power supplied to the moving part gets modulated with the pulses. The recovered voltage received at the moving part may be fed to one of the analog-to-digital converter channels of the microcontroller present on the non-stationary element's PCBA.

If the voltage measured by the analog-to-digital converter is less than a selected transition threshold, the microcontroller may record that a low voltage level has been received at the non-stationary element. If the voltage measured by the analog-to-digital converter is greater than a selected transition threshold, the microcontroller may record that a high voltage level has been received at the non-stationary element. If the microcontroller detects a low level, high level and low level in succession, the microcontroller may interpret this as a command.

Whenever the analog-to-digital converter completes a conversion, the output voltage may be compared against the low and high threshold voltage values to determine if a low level or high level is detected. In one example, the microcontroller starts a timer on detection of the first low level and stops it at the detection of the second low level, thus measuring the pulse interval, i.e. the time gap between pulses. Depending on the time gap measured, the microcontroller determines which command has been sent from the stationary control unit.

The following measures may be advantageously included in various examples. Both the stationary element controller and the non-stationary element controller may filter the output of the analog-to-digital converter to remove noise. The non-stationary element controller may require a high signal level between the two consecutive low signal levels, corresponding to the pair of pulses, to interpret the pair of pulses as a valid command. The non-stationary element controller may also use a further requirement of receiving confirmation of each command, in the form of at least two consecutive occurrences of the pair of pulses defining the command. The stationary element controller may send redundant repetitions of the pair of pulses for a given command, such as in a set of three pairs of pulses in a row, for example. Any other number of pairs of pulses may be used in other examples. The redundant pairs of pulses may be sent with the same pulse interval in each pair, and may also be sent with a given pair interval between each pair of pulses. The non-stationary element controller may be set to require reception of at least two repeated pairs of pulses within an acceptable time frame before interpreting the signal as a valid command. The non-stationary element controller may also check whether the pairs of pulses are separated by the pair interval, or by a multiple of the pair interval, such as double the pair interval, to correspond validly to a repeated transmission of the pair of pulses defining the command. Other variations of confirmation parameters may also be used in other embodiments, such as the stationary element controller repeating the pairs of pulses four consecutive times and requiring the non-stationary element controller to receive at least two of the pairs, or to receive at least three of the pairs, to confirm the command, for example.

The following criteria for choice of signal parameters are among those that may be used, and selected in different values, in various examples: the pulse width, the low level threshold voltage, the high level threshold voltage, the pulse interval i.e. the time interval between two consecutive pulses, the pair interval i.e. the time interval between consecutive pairs of pulses or consecutive commands, and the maximum time gap between two consecutive low levels. Criteria for selecting these parameters, in accordance with certain illustrative examples, are described as follows, while other criteria may be more appropriate in other examples depending on various factors.

For the choice of pulse width, the width of the pulse may be adequate to make the recovered voltage level at the non-stationary element controller fall below the low level threshold voltage level irrespective of the nominal recovered voltage level while a low pulse is being sent from the stationary element controller. For the choice of the low level threshold voltage level, this may be selected as the minimum value to which recovered voltage at the non-stationary element controller falls while a pulse is being sent from the stationary element controller and does not decrease thereafter on increasing the pulse width, in a normal voltage mode. The normal voltage mode is explained further below, in contrast to an intermediate voltage mode and a degraded voltage mode. For the choice of the high level threshold voltage, this may be selected as a voltage value that is greater than the low level threshold voltage level by an amount sufficient to clearly indicate at least a rising trend in the recovered voltage at the non-stationary element controller.

For the time interval between two pulses, i.e. the pulse interval, different values may be selected for different time intervals for different commands. The values selected for the pulse intervals may have sufficient offset considering the given tolerance range for the system, including the stationary element controller and the non-stationary element controller, in order to avoid an overlap. The total time duration of the pair of pulses encoding a command may be selected to be less than the maximum counting capacity of the microcontroller timer used in the non-stationary element controller, if applicable.

The time interval between consecutive pairs of pulses or consecutive commands, i.e. the pair interval, may be selected based on the average time required for the stationary element controller to transmit a single command and for the non-stationary element controller to detect and interpret a single command, so that the pair intervals aren't short enough to interfere with these processes of transmitting, detecting, and interpreting the commands. The maximum time gap between two consecutive low voltage levels may be selected as any interval up to the maximum counting capacity of the microcontroller timer chosen, if applicable.

Figure 2A:
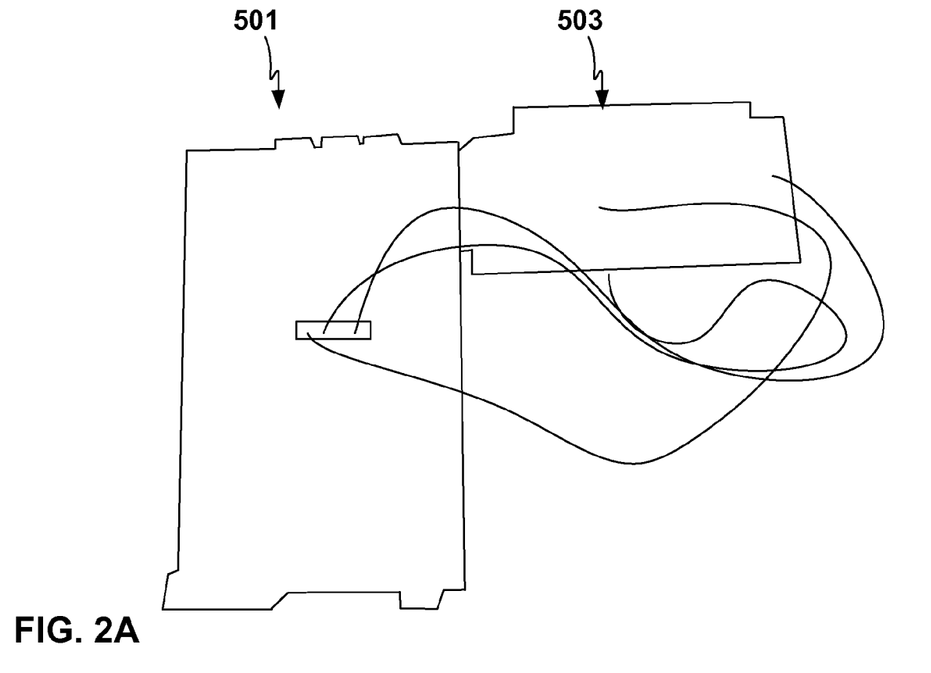
FIGS. 2A and 2B show perspective views of illustrative prototypes of various stator and rotor elements.
Figure 2B:
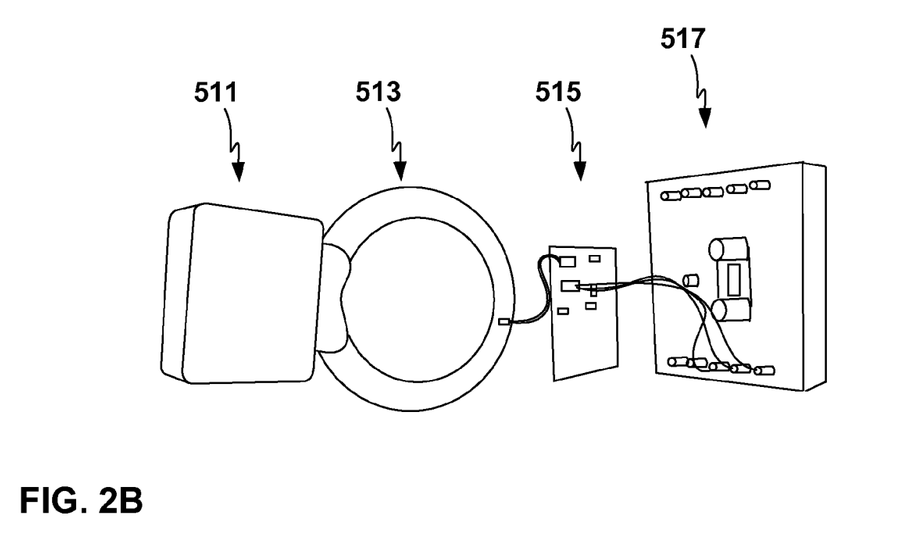

FIGS. 2A and 2B show perspective views of illustrative prototypes that include a stator control unit digital board 501 comprising a stationary element controller, a stationary control unit RF board 503, a coupling module (CM) 511, a rotor antenna 513, a rotor printed circuit board assembly (PCBA) 515 comprising a non-stationary element controller, and a precision calibrator 517, with which the inventors tested various aspects as discussed herein. The stator control unit digital board 501 comprising a non-stationary element controller, stationary control unit RF board 503, and coupling module (CM) 511 are an example of a stationary element that is configured to compose and transmit signals, and rotor antenna 513 and rotor PCBA 515 are an example of a non-stationary element that is configured to receive and interpret those signals transmitted by the stationary element.

In the illustrative example prototype depicted in FIGS. 2A and 2B, the stationary element is configured to transmit pulses with a pulse width of 3 milliseconds, a low level threshold voltage level of 4.6 volts, a high level threshold voltage level of 4.8 volts. The stationary element comprising stator control unit digital board 501 is further configured to transmit a pair of pulses with a first pulse interval defining a first command, defined as a "shunt calibration ON" command, and pair of pulses with a second pulse interval defining a second command, defined as a "shunt calibration OFF" command. In particular, the first pulse interval between consecutive pulses in a pair of pulses in this example was selected as three milliseconds, and the second pulse interval between consecutive pulses in a pair of pulses in this example was selected as eight milliseconds. The rotor antenna 513 and the non-stationary element controller comprised in rotor PCBA 515 are configured to receive the pulse pair signals transmitted by the stationary element, and to interpret a pulse pair with a three millisecond pulse interval as a "shunt calibration ON" command, to which the non-stationary element responds by going into a shunt calibration mode, and to interpret a pulse pair with an eight millisecond pulse interval as a "shunt calibration OFF" command, to which the non-stationary element responds by going into a normal data gathering and transmitting mode, such as to gather and transmit data collected from a torque sensor.

The stationary element is further configured with a time interval between consecutive pulse pairs, i.e. a pair interval, of nineteen milliseconds, and with a maximum time gap between two consecutive low levels of nineteen milliseconds. The non-stationary element may also be configured to interpret the incoming signal with additional checks based on these intervals, such as by checking whether at least two out of three pulse pairs are detected with nineteen millisecond pair intervals, before confirming a respective command, for example.

Figure 7:
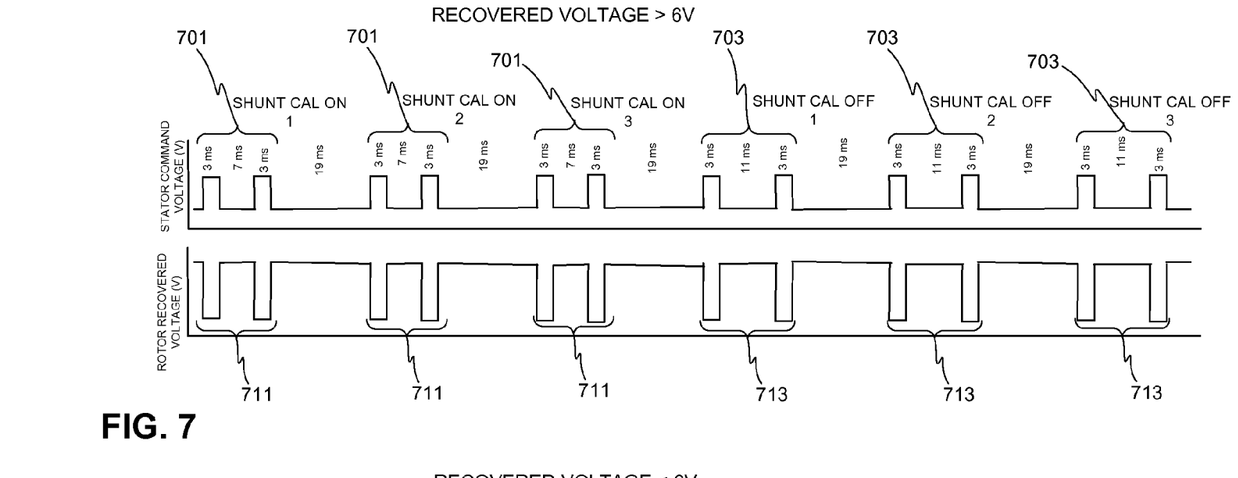
FIGS. 7 and 8 are graphs showing signals from a stator and signal responses recovered by a rotor in response to the stator according to various examples.
Figure 8:
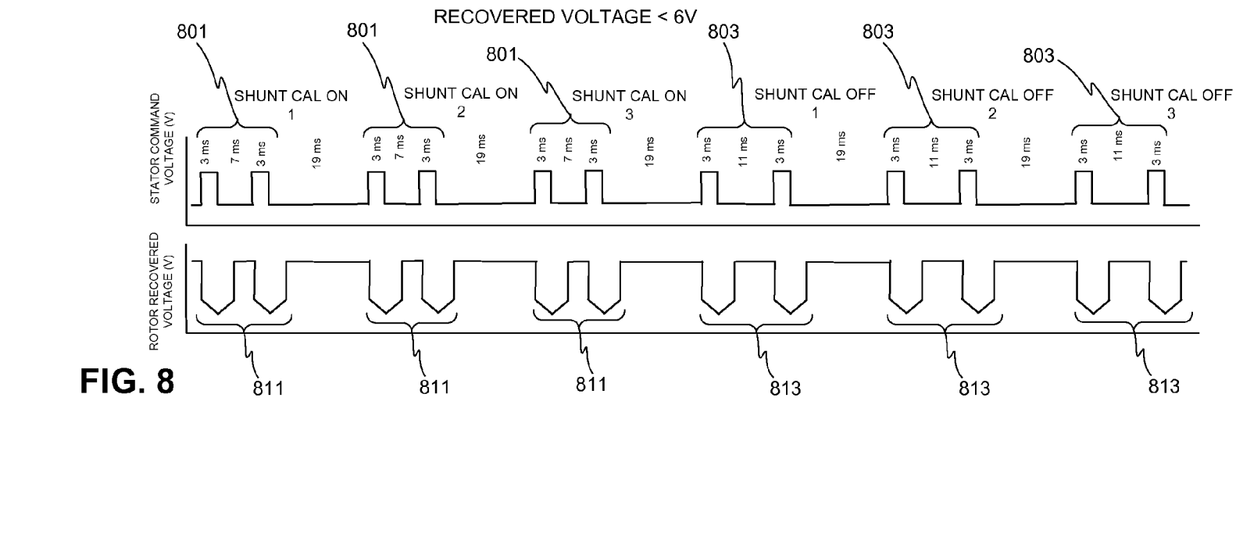

FIGS. 7 and 8 illustrate two examples of command structure signals, in different voltage regimes. FIG. 7 shows stator transmitted signals and rotor received signals in a normal voltage regime; FIG. 8 shows stator transmitted signals and rotor received signals in an intermediate voltage regime in which the voltage has dropped to a somewhat reduced, intermediate range. These are further described below.

The following indicates one illustrative example of command processing, including a stator transmitting a command to a rotor, and the rotor measuring the incoming wireless signal and interpreting the signal for a command. The stator microcontroller, an example of a stationary element controller, drives the pulse train on a general purpose output pin with the help of a timer. The rotor microcontroller, an example of a non-stationary element controller, performs the following steps, in an illustrative example. The rotor microcontroller may first average the recovered voltage measured through an analog-to-digital converter (ADC). The rotor microcontroller may then compare the averaged output value from the ADC against the low threshold voltage level, and may continue doing so until a low voltage level is detected, such as a low voltage threshold. If the rotor microcontroller initially detects the low voltage level, it may start a timer. The rotor microcontroller may compare the averaged output value against the low and high threshold voltage levels in succession. If the rotor microcontroller detects the high voltage level, it notes the presence of a higher trend for the recovered voltage. If the rotor microcontroller detects a low voltage level for the second time, it stops the timer, notes the timer count, and checks the time interval between the low voltage levels, i.e. the pulse interval, which it may measure from the end of the first pulse to the beginning of the second pulse, for example, though other conventions of how to time the pulse interval may also be used. The rotor microcontroller then interprets a command based on the pulse interval, such as by checking whether the pulse interval fits the profile for a command. The rotor microcontroller may then implement the command in the rotor.

If the rotor microcontroller detects that the time interval between low pulses exceeds the maximum allowed range of nineteen milliseconds in this example, the rotor microcontroller rejects the earlier pulse, in this example. If the rotor microcontroller is using a multiple-pair confirmation mode and doesn't receive a second instance of a matching pulse pair within a window of, for example, 84 milliseconds after receiving the first instance of the matching pulse pair, the rotor microcontroller may reject the first pulse pair. The rotor microcontroller may use different confirmation windows for different commands, such as 84 milliseconds for a pulse pair defining a first command, and 99 milliseconds for a pulse pair defining a second command, for example. If the rotor microcontroller detects a second pulse pair within a confirmation window and the second pulse pair defines a valid pulse interval but it doesn't match the pulse interval of the first pulse pair, the rotor microcontroller may reject the first pulse pair and proceed with the second pulse pair redefined to be a candidate first pulse pair, defining the beginning of a new confirmation window, for example.

A process such as described above for a stator microcontroller receiving and interpreting commands from the stator microcontroller was tested. Commands were verified by performing shunt calibration. During a normal data gathering operation mode (FIG. 7), data transmitted from the rotating element to the stationary control unit was monitored. The stationary element transmitted a pulse pair signal (701) defining a "shunt calibration ON" command, the non-stationary element received a pulse-pair signal (711), and a shunt resistor in the non-stationary element was placed in the circuit and the data received from the non-stationary element changed by 13% of the normal value, indicating a successful transition of the non-stationary element to a shunt calibration mode in response to successfully receiving and interpreting the pulse pair command. Then, the stationary element transmitted a pulse pair signal (703) defining a "shunt calibration OFF" command, the non-stationary element received a pulse-pair signal (713), and the shunt resistor was removed from the circuit and the data received from the non-stationary element returned to its normal value, indicating a successful transition of the non-stationary element back to a normal data gathering mode in response to successfully receiving and interpreting the second pulse pair command. FIG. 8 is further described below.

Figure 9:
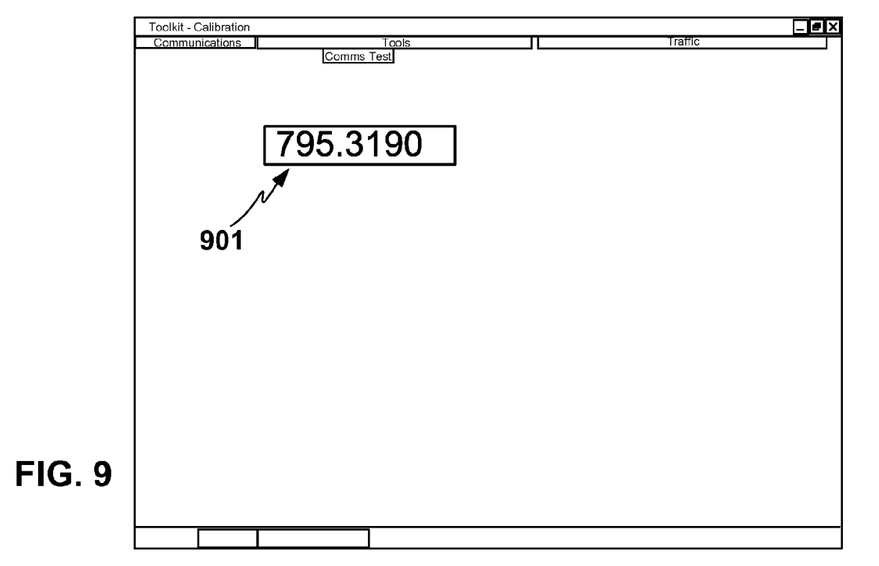
FIGS. 9 and 10 show screen shots of graphical user interface windows in various illustrative aspects.
Figure 10:
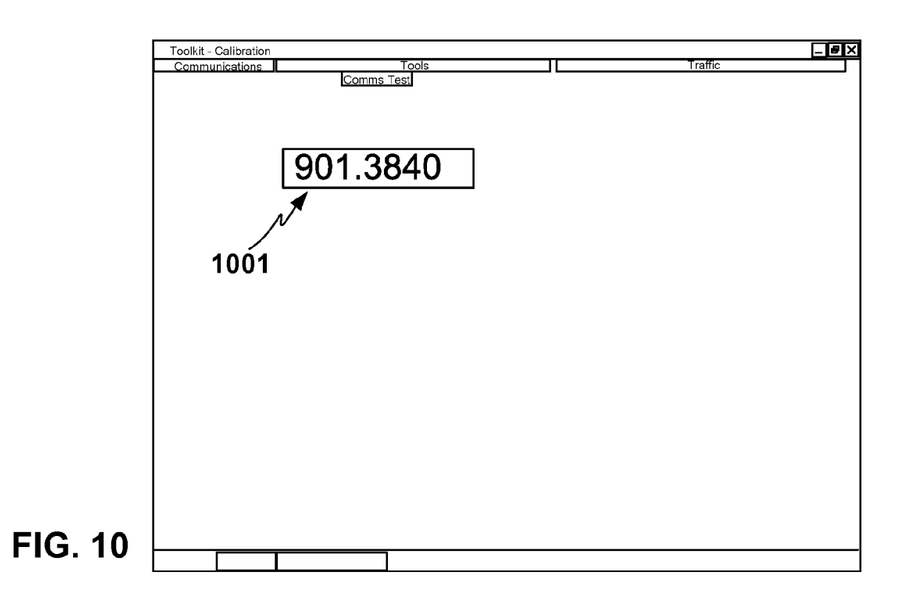

FIGS. 9 and 10 show screen shots for a graphical user interface window in an illustrative implementation, showing a computer displaying an application that transmits data to and receives data from the stationary element controller. FIG. 9 shows data being received at the stationary element controller from the non-stationary element before the stationary element has transmitted the "shunt calibration ON" command or after the stationary element has transmitted the "shunt calibration OFF" command, as described above, including data value shown in readout 901. FIG. 10 shows data being received at the stationary element controller from the non-stationary element after the stationary element has transmitted the "shunt calibration ON" command, or before the stationary element has transmitted the "shunt calibration OFF" command, as described above, including data value shown in readout 1001. The data value in readout 1001 is 13% more than the data value in readout 901, indicating that the non-stationary element was in the normal data gathering mode and then in the shunt calibration mode in response to the stationary element's pulse pair commands, as described above.

One illustrative example of this disclosure defines a method that includes sending commands and/or data from a stationary control unit, such as a stator, to a moving part, such as a rotor, in a wireless telemetry based system by means of controlling the RF amplitude so that the recovered DC voltage at the moving part can be measured to detect the command or data. Another illustrative example includes a method wherein the RF amplitude is set to 0 for a stipulated time so that it leads to a drop in recovered DC voltage as required by the method followed by setting it back to the nominal RF amplitude for a known time followed by again setting the RF amplitude to 0 and then back to nominal value. Another illustrative example includes a method wherein the RF amplitude is set to some value lower than its nominal value for a stipulated time so that it leads to drop in recovered DC voltage as required by the method followed by setting it back to the nominal RF amplitude for a known time followed by again setting the RF amplitude to the low value and then back to nominal value. Another illustrative example includes a method wherein the duration between two such pulses of recovered voltage is measured to detect the command or data.

In one illustrative application, a torque sensor rotor may be mounted on a shaft between an engine and a load, for example in a braking system. The rotor measures torque by strain gauges and returns the signal to the stator. The stator receives the data from the rotor and processes it. It may be desired to send commands or data from the stator to the rotor. This may be done using a wireless telemetry technique that measures both the voltage and the pulse interval, i.e. the time gap between pulses.

A combined voltage and pulse interval system may read the voltage over time, instead of only reading a pulse triggered by change in voltage, and only count a pulse if it is measured to a voltage transition that exceeds a selected transition threshold. The transition threshold may be between one and five volts in some examples, such as 1.8 volts in a particular example. For example, one illustrative example may have a starting voltage of 7.0 V and a threshold voltage of 5.2 volts. If the voltage drops from 7.0 V to 6.5 V, for example, but then recovers, no signal is accepted. If the voltage drops from 7.0 volts to 5.0 volts, for example, below the threshold of 5.2 volts, this is accepted as a trigger for the onset of a pulse.

A combined voltage and pulse interval system may also use a pulse width threshold, and only count a pulse if its voltage transition exceeds the voltage threshold with a pulse width that exceeds a pulse width threshold, in terms of the amount of time the voltage exceeds the transition threshold. For example, the system may use a pulse width threshold in the range of milliseconds, such as three milliseconds, for example, as shown in FIGS. 7 and 8. The voltage must remain below the transition threshold, such as 5.2 volts, for at least the pulse time, such as three milliseconds, to be counted as a pulse. Therefore, after the voltage falls below the threshold and is read as the trigger for the onset of a pulse, the microcontroller may wait and see when the voltage rises back above the threshold. If the voltage rises back above the threshold before the pulse period of three milliseconds has elapsed, then the original start threshold trigger is disregarded and no pulse is counted. The present inventors have found that a pulse period threshold in the millisecond range, such as three milliseconds, is substantially resistant to noise, i.e. is substantially resistant to having an unintended pulse triggered or counted by brief, random electrical or magnetic noise. A pulse period threshold above one millisecond may also be resistant to random electrical or magnetic noise. Other pulse period thresholds below one millisecond but greater than in the range of twenty microseconds may also be resistant to random electrical or magnetic noise depending on the context of different operating environments.

The system may also use either the same pulse width threshold, or different thresholds, to count as the beginning and ending of a pulse. In the example above, the same threshold of 5.2 volts is used for both, so that the voltage falling below 5.2 volts is counted as the beginning of a pulse, and then the voltage rising back above 5.2 volts, but not before three milliseconds have elapsed, is counted as the end of a pulse and a complete pulse is recorded. Another example may use a pulse beginning threshold (i.e. a low level threshold) of 4.6 volts, and a pulse ending threshold (i.e. a high level threshold) of 4.8 volts, for example. In this case, the voltage falling below 4.6 volts is counted as the beginning of a pulse, and then the voltage rising above 4.8 volts, but not before three milliseconds have elapsed, is counted as the end of a pulse and a complete pulse is recorded. The transition threshold may therefore be treated differently to measure the beginning and end of a pulse width threshold, in a combined voltage and pulse interval system. For example, the transition threshold may be relatively larger to begin a pulse than to finish a pulse. The transition threshold may also be relatively lower in an intermediate voltage mode in which a relatively lower transition threshold may be combined with a relatively longer pulse width threshold. In another example of an intermediate voltage mode, the same voltage threshold may be combined with a relatively longer pulse width threshold when the starting voltage has become relatively lower than normal to trigger the intermediate mode. Therefore, in the normal voltage mode, the non-stationary element controller may be configured to compare each of the pulses with a normal mode pulse width threshold, and in the intermediate voltage mode the non-stationary element controller may be configured to compare each of the pulses with an intermediate mode pulse width threshold that is longer than the normal mode pulse width threshold.

In an illustrative example, the rotor ring has inductors combined with capacitors forming a parallel LC network tuned to particular frequency, such as 13.56 megahertz or 16.58 megahertz, for example. The stator may generate a signal at a frequency and send it into an LC circuit in the stator, where the stator LC circuit is a series LC circuit instead of parallel. The stator LC circuit may also be tuned to approximately the same frequency as the rotor LC circuit, such as 13.56 megahertz, but slightly off, such as 13.561 megahertz. The stator may transfer power at 13.56 megahertz into the rotor, and the rotor sends power back that encodes data that is read by the stator and sent back to the signal processing module (SPM). The stator therefore sends out RF power at approximately 13.56 MHz which is received by the rotor, and depending on coupling, the recovered voltage at the rotor can range between about 6 and 11 volts, in this example. For all circuitry to work well in the rotor in this example, it may need a minimum voltage such as about 5 volts, in this example, though the microcontroller may run at a lower voltage, such as 3.3 volts. The initial voltage, which may be 10 volts in this example, may be sent into a level measurement section, and stepped down into a voltage divider circuit. In other examples, an initial voltage from 6 to 11 volts, for example, may be run through the voltage divider circuit before being provided to the microcontroller. An ADC in the microcontroller may read that voltage and compare it to a reference level of e.g. 1.1 V. The voltage divider may step the recovered voltage down to a range of e.g. 1 to 1.1 volt. When the stator voltage cuts off, the voltage in the rotor may drop down to a new level.

A combined voltage and pulse interval system may measure transitions in voltage over a course of time to interpret as data or command signals, rather than interpreting simple voltage levels directly into data or command signals. A combined voltage and pulse interval system may require a minimum voltage difference as a transition between a starting voltage and a signaling pulse voltage, such as at least a difference of 1.5 volts, for example, and only interpret a voltage change as a signal pulse if it meets the minimum transition in voltage within a specified time frame. For instance, if the nominal starting voltage is 7.0 volts, the system may have a single threshold voltage of at most 5.5 volts in this example (or a high level threshold of at most 5.5 volts in an example using a starting voltage of 7.0 V and two different voltages for pulse beginning and end thresholds).

Relying on transitions in voltage, with a minimum difference in voltage before and after the transition, rather than absolute voltage measurements, provides various advantages. For example, a system in operation may experience drift in its overall voltage level. A system that is nominally supposed to have a starting voltage of 7.0 volts may drift down to a starting voltage of 6.0 volts. But, the system may nevertheless require a short-term voltage transition of 1.5 volts to count as a signal pulse beginning or ending. This is more resistant to false positives than if the drifting system still interpreted a voltage of 5.5 as a signal, which could be triggered by transient voltage noise of only 0.5 volts. When the overall voltage level is lower, measuring the voltage transitions by themselves tends to become less reliable.

A system of this disclosure may begin to behave less reliably overall when voltage drifts lower, in one example. In particular, there may be a voltage range that is so low that the system becomes too unreliable, but there may also be an intermediate voltage range where the system responses become distorted from normal responses, while those distorted responses may be compensated for so that the system still behaves reliably using new techniques the inventors have devised as part of a combined voltage and pulse interval system. Torque measurement system voltage levels may naturally drift downward into this intermediate, distorted response range in the course of normal operation, and may normally be considered unreliable and incapable of proper functioning in this degraded voltage range in normal circumstances. However, examples of the present combined voltage and pulse interval system may successfully compensate for this distorted voltage range so that a torque measurement system still functions reliably when its voltage is in this distorted range. This difference is illustrated in FIGS. 7 and 8, where FIG. 7 shows a system operating in the nominal voltage range, and FIG. 8 shows the same system operating in the intermediate degraded voltage range.

In particular, the rotor recovered voltage response may become longer, and slower to make the full transition drop, exhibiting a V-shaped profile of voltage change in the pulse-pair signals (811, 813) received by the non-stationary element, when in the intermediate voltage range, in response to the pulse pair signals (801, 803) from the stationary element, as shown in FIG. 8. In an illustrative example, a rotor system may exhibit the normal recovered voltage responses (711, 713) as in FIG. 7 when the starting voltage is above about 6.0 volts, but may degrade into the distorted voltage responses (811, 813) as in FIG. 8 when the starting voltage is below an intermediate mode cutoff voltage of about 6.0 volts and above a degraded mode cutoff voltage of about 5.2 volts, in this example.

In various examples of this new system, the rotor may check whether the starting voltage is below the intermediate mode cutoff voltage and above the degraded mode cutoff voltage, and if so, the rotor may enter an intermediate voltage mode, where it changes its parameters for interpreting the signal in expectation of, or to compensate for, the intermediate type voltage responses as exhibited in FIG. 8. So, for instance, the rotor may check whether the starting voltage is above or below 6.0 volts, and if it is above 6.0 volts, the rotor interprets incoming signals from the stator in the normal voltage mode, while if the starting voltage is below 6.0 volts, the rotor interprets incoming signals from the stator in the intermediate voltage mode. For example, while in the normal voltage mode the rotor may normally measure for the pulses to have a pulse width within a normal tolerance range of perhaps plus or minus 0.3 milliseconds above or below the normal pulse width of 3 milliseconds (i.e. a range of 2.7 to 3.3 milliseconds, in an illustrative example), in the intermediate voltage mode, the rotor may alter the tolerance range to plus 2.0 and minus 0 milliseconds above or below the normal pulse width of 3 milliseconds (i.e. a range of 3.0 to 5.0 milliseconds, in this illustrative example). The rotor may validate or invalidate signals as confirmed pulses in either of these two interpretive regimes, depending on the voltage level, in reconstructing and interpreting the signal.

The rotor may also check whether the starting voltage is above or below a degraded mode cutoff voltage that is lower than a degraded mode cutoff voltage, illustratively such as 5.2 volts, and if the rotor detects that the starting voltage has fallen below the degraded mode cutoff, the rotor may enter a dormant mode in which it refrains from attempting to interpret the commands or data from the pairs of voltage pulses. The rotor may also indicate to a user that it is in the dormant mode, and/or take any other steps appropriate to resolve or compensate for insufficient voltage for reliable operation. For example, the rotor may send an error message to a local or remote output or user interface, or command the system deactivate, for example. In certain illustrative operating examples, the degraded mode cutoff may be around 4.8 or 4.6 volts, for example, though this depends on context and any other voltage may be applicable in other contexts.

Therefore, a torque measurement system may include a rotor configured such that reconstructing the pulse width of each of the spikes and the pulse interval of the pulses from the transitions in voltage over time comprises: checking whether a starting voltage is above or below an intermediate mode cutoff voltage; if the starting voltage is above the intermediate mode cutoff voltage, then using a normal voltage mode to interpret the commands or data from the pairs of voltage pulses; and if the starting voltage is below the intermediate mode cutoff voltage, then using an intermediate voltage mode to interpret the commands or data from the pairs of voltage pulses.

Additionally, in an example, a torque measurement system may have a rotor further configured such that reconstructing the pulse width of each of the spikes and the pulse interval of the pulses from the transitions in voltage over time comprises: checking whether the starting voltage is above or below a degraded mode cutoff voltage, that is lower than the intermediate mode cutoff voltage; and if the starting voltage is below the degraded mode cutoff voltage, then entering a dormant mode and refraining from attempting to interpret the commands or data from the pairs of voltage pulses.

In an example of the rotor interpreting the signals, the rotor may check for a defined voltage shift from one level to another level—for example, two pulses at three milliseconds each (depending on the tolerances of either the normal or intermediate mode, as appropriate) with a gap, i.e. pulse interval, of seven milliseconds between pulses in a pair. The stator also may be configured to repeat transmissions of the pairs of pulses, such as in triplets of pairs, and may have a defined pair interval of time between each of the pairs in the triplets, as is also shown in FIGS. 7 and 8. The rotor may also be configured for any of various interpretive rules for signal reception and error checking, such as accepting two out of three pairs recorded to interpret the signal, such as to confirm a command.

As also shown in FIGS. 7 and 8, two different commands are being sent from a stator to a rotor. In the first half of FIG. 7 as well as in the first half of FIG. 8, the stator sends a triplet that may encode a first command, such as "Shunt Cal ON" in this example. This command may be intended to switch the rotor from a normal data collecting mode into a shunt calibration mode. In the second half of each of FIGS. 7 and 8, the stator sends a triplet that may encode a second command, such as "Shunt Cal OFF" in this example, which is intended to switch the rotor from the shunt calibration mode back into a normal data collecting mode.

Shunt cal, i.e. calibration, commands may be sent to the rotor for calibration purposes. These are only illustrative examples of command signals from the stator to the rotor, and signals from the stator to the rotor may encode a variety of forms of data and/or a variety of commands to enter different modes of operation. For example, the stator/rotor set may operate as master/slave. As another example, the stator may signal the rotor with a command to change from 15-bit mode to 20-bit mode.

An algorithm may be introduced inside microcontrollers inside rotors and stators, and rotor electronics themselves, including microcontrollers. Any of various aspects as described herein may be implemented in hardware, or in software, or any combination thereof. In some examples, various aspects of the system described herein have been found to reduce the number of hardware elements required on the rotor electronics board, eliminating six to eight components from the RTE board, including resistors, diodes and capacitors. This has freed up substantial amounts of RTE real estate, a very valuable benefit.

The screenshots in FIGS. 9 and 10 show an example in which an RS232 link between a stator and a computer shows the torque read from rotor. The difference indicated is prompted by the shunt resistor being brought into parallel with one arm of a Wheatstone bridge, where the original output of the Wheatstone bridge has an imbalance of 10 mV, the shunt resistor shifts output of the imbalance to e.g. 9 or 11 mV. If the original value is 0, the output of shunt calibration may be around e.g. 70% of full-scale output volts. The percentage of shift may be set arbitrarily, and many other implementations very different from the aspects shown in FIGS. 9 and 10 are contemplated. In this example, a user may send a shunt calibration command by pressing physical button in stator itself or a GUI button on the computer between "Shunt Cal ON" and "Shunt Cal OFF".

Quality testing has also been done, in which "Shunt Cal ON" and "Shunt Cal OFF" commands were sent in rapid succession hundreds of times in a row, and switching off or reducing RF power in the stator for a couple of milliseconds at a time, the results of which showed excellent reliability.

Various examples have been described herein. These and other examples are within the scope of the following claims. Any of a wide variety of variations and combinations of the examples and implementations described above may be made, within the scope of the claims as follows.

What is claimed is:

1. A wireless signaling system comprising:
   a stationary element device comprising a stationary element controller, the stationary element device configured to transmit a wireless signal comprising a pair of pulses; and
   a non-stationary element device comprising a non-stationary element controller, the non-stationary element device configured to:
      receive the wireless signal from the stationary element controller;

measure a transition in voltage of each of the pulses and a time interval between said each of the pulses; and interpret the wireless signal based on the transition in the voltage of said each of the pulses and the time interval between said each of the pulses, wherein the non-stationary element controller is further configured to compare the transition in the voltage of said each of the pulses to a transition threshold, and if the transition in the voltage of said each of the pulses is more than the transition threshold, then to compare the time interval between said each of the pulses with a directory of signals indicated by a value of the time interval, wherein if the transition in the voltage of said each of the pulses is measured to be greater than the transition threshold and the time interval between said each of the pulses matches a first reference interval, then the wireless signal is interpreted to indicate a calibration mode for the non-stationary element device, and wherein if the transition in the voltage of said each of the pulses is measured to be greater than the transition threshold and the time interval between said each of the pulses matches a second reference interval, then the wireless signal is interpreted to indicate a data collecting mode.

2. The wireless signaling system of claim 1, wherein the stationary element device comprises a stator, and the non-stationary element device comprises a rotor.

3. The wireless signaling system of claim 1, wherein the non-stationary element controller is further configured to compare the transition in the voltage of said each of the pulses to the transition threshold, and if the transition in the voltage of said each of the pulses is less than the transition threshold, then to reject said each of the pulses.

4. The wireless signaling system of claim 3, wherein the non-stationary element controller is further configured to use the transition threshold of between 0.5 and 5 volts.

5. The wireless signaling system of claim 1, wherein the pair of pulses is a first pair of pulses and the stationary element device is further configured to transmit the wireless signal to comprise a second pair of pulses, wherein the second pair of pulses is separated from the first pair of pulses by a pair interval, and the non-stationary element controller is further configured to interpret a second signal based at least in part on the pair interval.

6. The wireless signaling system of claim 5, wherein the stationary element device is further configured to transmit the wireless signal to comprise a third pair of pulses, separated from the second pair of pulses by the pair interval, wherein each of the first, second, and third pairs of pulses has a same time interval between said each of the pulses, wherein the non-stationary element controller is further configured to interpret a third signal based on receiving any two pairs of the pulses out of the first, second and third pairs of pulses separated by the pair interval.

7. The wireless signaling system of claim 1, wherein the stationary element device is further configured to transmit a triplet of pairs of voltage pulses, wherein the triplet comprises first, second, and third pairs of two pulses each, with a pair interval between the second and third pairs of said two pulses that is the same as the pair interval between the first and second pairs of said two pulses, wherein the non-stationary element controller is further configured to interpret the triplet of pairs in a selected interpretation as long as the non-stationary element controller is able to receive and interpret at least two of the first, second, and third pairs of said two pulses.

8. The wireless signaling system of claim 1, wherein the non-stationary element controller is further configured such that said interpreting the wireless signal based on the transition in the voltage of said each of the pulses and the time interval between said each of the pulses comprises:

checking whether a starting voltage is above or below an intermediate mode cutoff voltage;

if the starting voltage is above the intermediate mode cutoff voltage, then using a normal voltage mode to interpret the commands or data from the pair of pulses; and if the starting voltage is below the intermediate mode cutoff voltage, then using an intermediate voltage mode to interpret the commands or the data from the pair of pulses.

9. The wireless signaling system of claim 8, wherein the non-stationary element controller is further configured such that in the normal voltage mode, the non-stationary element controller is configured to compare said each of the pulses with a normal mode pulse width threshold, and in the intermediate voltage mode the non-stationary element controller is configured to compare said each of the pulses with an intermediate mode pulse width threshold that is longer than the normal mode pulse width threshold.

10. The wireless signaling system of claim 1, wherein the non-stationary element controller is further configured such that said interpreting the wireless signal based on the transition in the voltage of said each of the pulses and the time interval between said each of the pulses comprises:

checking whether a starting voltage is above or below a degraded mode cutoff voltage; and if the starting voltage is below the degraded mode cutoff voltage, then entering a dormant mode and refraining from attempting to interpret the wireless signal.

11. The wireless signaling system of claim 1, wherein the stationary element device and the non-stationary element device are inductively coupled, wherein the wireless signal is configured to provide RF signal power to the non-stationary element device, and wherein the non-stationary element device is further configured to:

generate a DC voltage based on receiving the wireless signal from the stationary element controller, wherein the pair of pulses create a drop in the generated DC voltage at the non-stationary element device.

12. A wireless signaling method comprising:

transmitting a wireless signal from a stationary element device, the wireless signal comprising a pair of pulses;

receiving the wireless signal from the stationary element device with a non-stationary element device;

measuring, with a non-stationary element controller comprised in the non-stationary element device, a transition in voltage of each of the pulses and a time interval between said each of the pulses; and interpreting, with the non-stationary element controller, the wireless signal based on the transition in the voltage of said each of the pulses and the time interval between said each of the pulses;

comparing, with the non-stationary element controller, the transition in the voltage of said each of the pulses to a transition threshold, and if the transition in the voltage of said each of the pulses is more than the transition threshold, then comparing the time interval between said each of the pulses with a directory of signals indicated by a value of the time interval; and comparing, with the non-stationary element controller, the transition in the voltage of said each of the pulses to the transition threshold, and if the transition in the voltage of said each of the pulses is more than the transition threshold and the time interval between said each of the pulses matches a reference interval, then the wireless signal is interpreted to indicate a calibration mode for the non-stationary element device;

comparing, with the non-stationary element controller, the transition in the voltage of said each of the pulses to the transition threshold, and if the transition in the voltage of said each of the pulses is more than the transition threshold and the time interval between said each of the pulses matches a second reference interval, then the wireless signal is interpreted to indicate a data collecting mode.

13. The wireless signaling method of claim 12, further comprising said comparing, with the non-stationary element controller, the transition in the voltage of said each of the pulses to the transition threshold, and if the transition in the voltage of said each of the pulses is less than the transition threshold, then rejecting said each of the pulses.

14. The wireless signaling method of claim 12, wherein the pair of pulses is a first pair of pulses and the method further comprises said transmitting, with the stationary element device, the wireless signal to comprise a second pair of pulses separated from the first pair of pulses by a pair interval, wherein said interpreting the wireless signal further comprises said interpreting the wireless signal based at least in part on the pair interval.

15. The wireless signaling method of claim 12, wherein said interpreting the wireless signal based on the transition in the voltage of said each of the pulses and the time interval between said each of the pulses further comprises:
checking whether a starting voltage is above or below an intermediate mode cutoff voltage;
if the starting voltage is above the intermediate mode cutoff voltage, then using a normal voltage mode to interpret commands or data from the pair of pulses; and
if the starting voltage is below the intermediate mode cutoff voltage, then using an intermediate voltage mode to interpret the commands or the data from the pair of pulses.

16. The wireless signaling method of claim 12, wherein said interpreting the wireless signal based on the transition in the voltage of said each of the pulses and the time interval between said each of the pulses further comprises:
checking whether a starting voltage is above or below a degraded mode cutoff voltage; and
if the starting voltage is below the degraded mode cutoff voltage, then entering a dormant mode and refraining from attempting to interpret the wireless signal.

17. The wireless signaling method of claim 12, wherein the stationary element device and the non-stationary element device are inductively coupled, wherein the wireless signal provides RF signal power to the non-stationary element device, and wherein the method further comprises:
generating a DC voltage at the non-stationary element device in response to receiving the wireless signal from the stationary element device, wherein said measuring the transition in the voltage of said each of the pulses comprises measuring a drop in the DC voltage in response to said each of the pulses.

18. A torque measurement apparatus comprising:
a stator configured to transmit a wireless control signal, wherein the wireless control signal comprises a plurality of pulses; and
a rotor comprising a rotor controller, the rotor configured to:
receive the wireless control signal from the stator;
measure a transition in voltage of each of the plurality of pulses and a time interval between said each of the plurality of pulses; and
interpret a control command based on the transition in the voltage of said each of the plurality of pulses and the time interval between said each of the plurality of pulses,
wherein if the transition in the voltage of said each of the plurality of pulses is measured to be greater than a transition threshold and the time interval between said each of the plurality of pulses matches a first reference interval, then the control command is interpreted to indicate a calibration mode for the rotor, and if the transition in the voltage of said each of the plurality of pulses is measured to be greater than the transition threshold and the time interval between said each of the plurality of pulses matches a second reference interval, then the control command is interpreted to indicate a data collecting mode, wherein in the calibration mode for the rotor, the rotor is configured to perform a calibration or adjust a data communication value, and wherein in the data collecting mode, the rotor is configured to measure data and transmit the data to the stator.

19. The torque measurement apparatus of claim 18 wherein, in the calibration mode, the rotor performs at least one of: a shunt calibration, adjusting a data rate, or adjusting a number of data bits; and in the data collecting mode, the rotor measures a torque and transmits the data about the torque to the stator.

20. The torque measurement apparatus of claim 18, wherein the transition in the voltage comprises a drop in a first voltage generated at the rotor in response to said each of the plurality of pulses.

* * * * *